(12) United States Patent
Chiang

(10) Patent No.: US 6,988,051 B2
(45) Date of Patent: Jan. 17, 2006

(54) WINDOW AVERAGE STATISTICS MODEL FOR POINTING STABILITY JITTER ANALYSIS

(75) Inventor: Richard Y. Chiang, Torrance, CA (US)

(73) Assignee: The Boeing Company, Chicago, IL (US)

( * ) Notice: Subject to any disclaimer, the term of this patent is extended or adjusted under 35 U.S.C. 154(b) by 154 days.

(21) Appl. No.: 10/713,340

(22) Filed: Nov. 14, 2003

(65) Prior Publication Data

US 2005/0107981 A1 May 19, 2005

(51) Int. Cl.
*G06F 101/14* (2006.01)

(52) U.S. Cl. .................. 702/181; 702/179
(58) Field of Classification Search ........... 700/302; 701/1, 3, 4, 13; 702/1, 57, 66, 69, 81, 127, 702/150, 151, 152, 153, 166, 179, 180, 181, 702/182, 183, 190, 199; 703/2, 1, 7, 8
See application file for complete search history.

(56) References Cited

U.S. PATENT DOCUMENTS

| 4,752,884 A | * | 6/1988 | Slafer et al. .................. 701/13 |
| 6,298,315 B1 | * | 10/2001 | Li et al. ..................... 702/180 |
| 6,356,850 B1 | * | 3/2002 | Wilstrup et al. .............. 702/69 |
| 6,640,193 B2 | * | 10/2003 | Kuyel ......................... 702/69 |
| 2003/0125888 A1 | * | 7/2003 | Yamaguchi et al. ........... 702/69 |
| 2003/0202573 A1 | * | 10/2003 | Yamaguchi et al. ......... 375/226 |
| 2004/0136450 A1 | * | 7/2004 | Guenther .................... 375/226 |

OTHER PUBLICATIONS

Rondinelli, L; "Effects of Random Errors on the Performance of Antenna Arrays of Many Elements"; IRE International Convention Record; vol. 7; Mar. 1959; pp 174–189.*

* cited by examiner

*Primary Examiner*—Michael Nghiem
*Assistant Examiner*—Douglas N Washburn
(74) *Attorney, Agent, or Firm*—Shimokaji & Associates, P.C.

(57) ABSTRACT

A method of analysis to process jitter information by using a window average statistic model to determine a pointing accuracy. The pointing accuracy ultimately determines whether or not a mission can proceed. The process includes the following: collect a signal, process the signal to produce data, insert the data from the signal into a statistical model to produce statistics, compile the statistics using the statistics model to produce a probability density function, integrate the probability density function to produce a probability distribution function, determine a pointing accuracy from the probability distribution function.

26 Claims, 6 Drawing Sheets

WINDOW AVERAGE STATISTICS MODEL FOR POINTING STABILITY JITTER ANALYSIS

BACKGROUND OF THE INVENTION

The present invention generally relates to pointing stability jitter analysis and, more particularly, to a window average statistics model for pointing stability jitter analysis.

Pointing stability jitter analysis is one of the most important analysis tasks in attitude control subsystem (ACS) design. Pointing stability analysis provides the following critical information before the launch of a spacecraft: a pointing stability of the spacecraft following a maneuver profile command; a pointing robustness at a target in space during a long period of time in a mission; a pointing performance of spacecraft attitude jitter with particular ACS pointing requirements being met or not met. Without an analysis of the pointing jitter to make sure the information is within given requirements there would be no mission.

Typically ACS designers will need to run hundreds of simulation cases to ensure that all of the simulation cases are within the pointing requirements after the attitude controller or ACS design is complete. Running numerous simulation cases is a time consuming task and places a huge burden on the designers who perform the task. A solution is needed that reduces substantially and almost eliminates the need for running numerous simulation cases by providing a statistics model to almost eliminate the cumbersome endless simulation runs. The heart of the problem with other people's attempts is the need to run numerous simulation runs. There is a need for a solution that cuts down design cycle time, lowers project cost and helps prevent lost revenue.

When analyzing thousands of signals out of hundreds of simulation runs, a single violation of the pointing stability requirements can cause an ACS design, to fail. Since modifications to the ACS are often inconvenient and time consuming, failures of this type can be very costly. There is a need to solve the pointing violation problem without alterations to the ACS set design. A solution is needed to accomplish this by using a statistics model to accurately predict how a particular ACS design will function ahead of time.

At present, there is no tool for pointing jitter signal analysis that does not require altering the ACS design. Without a statistical solution, designers, using typical solution methods, would simply overwhelm the ACS computer with hundreds, if not thousands, of simulation cases. After collecting the simulation cases, the designers would hope that signals were all within the necessary pointing requirements.

As can be seen, there is a need for pointing stability jitter analysis in an attitude control subsystem that avoids numerous simulation runs. The analysis of the information is critical to the launch of a spacecraft. Without a proper analysis of pointing jitter properties to make sure they are within given requirements there can be no mission. There is therefore a need for avoiding numerous simulation runs in order to provide the pointing jitter properties that are compared with given requirements in determining whether or not a mission can proceed.

SUMMARY OF THE INVENTION

In one aspect, the present invention provides a method of analyzing a signal comprising the steps of: collecting a signal; processing the signal to produce data; inserting the data from the signal into a statistical model to produce statistics; compiling the statistics using the statistical model to produce a probability density function; integrating the probability density function to produce a probability distribution function; and determining a pointing accuracy from the probability distribution function.

In one aspect of the present invention, a statistics model is disclosed for analyzing spacecraft attitude pointing stability in a jitter analysis, the statistics model having signals processed to accurately predict the pointing stability in flight comprising the steps of: defining an ergodic random process statistically and mathematically; creating a window averaging technique to slide through simulated signals; building the statistics model; loading statistics into a statistics metric and creating a probability density function; and integrating the PDF to a probability distribution function and reading out a 3-sigma (3-$\sigma$) pointing accuracy against requirements.

In another aspect of the present invention, a method is disclosed for analyzing spacecraft attitude pointing stability in a jitter analysis by processing a limited number of signals to accurately predict the pointing stability in flight, the method comprising the steps of: defining an ergodic random process statistically and mathematically creating a window averaging technique to slide through the simulated signals building the statistics models; placing the statistics into a histogram and create the Probability Density Function (PDF); and integrating the PDF to Probability Distribution function and reading out the 3-$\sigma$ pointing accuracy against the requirements.

In still another aspect of the present invention, a signal processing scheme is disclosed for analyzing spacecraft attitude stability in a jitter analysis. The scheme processes a limited number of signals to accurately predict a pointing stability in flight, the scheme comprising the steps of: collecting a signal and processing the signal to produce data. The scheme further comprises inserting the data from the signal into a statistical model consisting of statistics metric S(t) to produce statistics and deriving the statistics metric using a sliding window T across the entire signal X(t) one sample at a time. The scheme further comprises the sliding window T collects S(t) at each window T and S(t) is a pointing accuracy. The scheme further comprises compiling the statistics using the statistical model to produce a histogram probability density function and integrating the probability density function to produce a probability distribution function. The scheme further comprises determining a pointing accuracy from the probability distribution function where, the pointing accuracy is 99.8% of the probability distribution function.

These and other features, aspects and advantages of the present invention will become better understood with reference to the following drawings, description and claims.

BRIEF DESCRIPTION OF THE DRAWINGS

FIG. 3 shows, according to one embodiment of the present invention, a histogram of the random signal of FIG.

1 consisting of a probability density function after the random signal is put into a statistics metric S(t). This histogram represents a form of the data derived using the sliding window T in FIG. 1. The data is derived by sliding the window T across the entire random signal X(t) one sample shift at a time and collecting the data S(T) at each window T;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

One embodiment solves the point violation problem, in pointing stability jitter analysis of the ACS design in spacecraft and satellites. An embodiment bypasses the typical analysis concepts by building a statistics model around a much smaller set of simulation runs to characterize the overall pointing properties. At the end of the analysis, an embodiment will come up a 3-$\sigma$ number for the pointing accuracy to comply with given pointing requirements. Using an embodiment, a tremendous amount of project cycle time and cost can be saved. Furthermore, an embodiment of the present invention provides a more correct analysis than other attempts at solving pointing stability analysis or pointing accuracy problems.

In one embodiment a statistics model is built to analyze a spacecraft's attitude pointing stability in a jitter analysis. Processing a limited number of signals through an innovative tool set this embodiment will accurately predict the pointing stability in flight. The embodiment sets out a signal processing scheme which includes: defining an ergodic random process statistically and mathematically; creating a window averaging technique to slide through simulated signals; building a statistics model, the statistics model is a first, second or third method. The next step is placing the statistics into a histogram to create the Probability Density Function (PDF1); integrating the PDF1 to produce a Probability Distribution Function (PDF2); and reading out a 3-$\sigma$ pointing accuracy then comparing the 3-$\sigma$ pointing accuracy with requirements. Sets, for the various methods MATLAB™ software implemented routines, are used to process parts of the embodiment in a numerical fashion.

A method of analyzing a signal is shown in this embodiment. This method comprises the steps of: collecting a signal or a random signal and processing the signal to produce data. Furthermore, the method includes inserting the data from the signal into a statistical model to produce statistics and compiling the statistics using the statistical model to produce a probability density function. The method of analyzing a signal further includes integrating the probability density function to produce a probability distribution function; and determining a pointing accuracy from the probability distribution function. The statistics model uses one of three statistical methods namely the first, second or third methods. All three methods use a statistics metric S(t), deriving the statistics metric using a sliding window T across the entire signal X(t) one sample at a time while the sliding window T collects S(t) at each window T. The statistics metric S(t) is a pointing accuracy, using the first method, the pointing accuracy is a maximum excursion in X(t) from $X(t_o)$ in window T and $S(t)=\max|X(t+\tau)-X(t)|$ where $t \in [0,T]$. Using the second method the statistics metric S(t), a pointing accuracy, the pointing accuracy is a maximum peak-to-peak in window T and $S(t)=\max(X(t+\tau))-\min(X(t+\tau))$ where $t \in [0,T]$. Using the third method, the statistics metric S(t), a pointing accuracy, the pointing accuracy is a root-mean-square (rms) of X(t) in window T and $S(t)=X(t))$: $X(t+\tau)$ where $t \in [0,T]$. The probability density function may be a histogram. The pointing accuracy may be equal to 99.8% of the probability distribution function.

Figure 2:
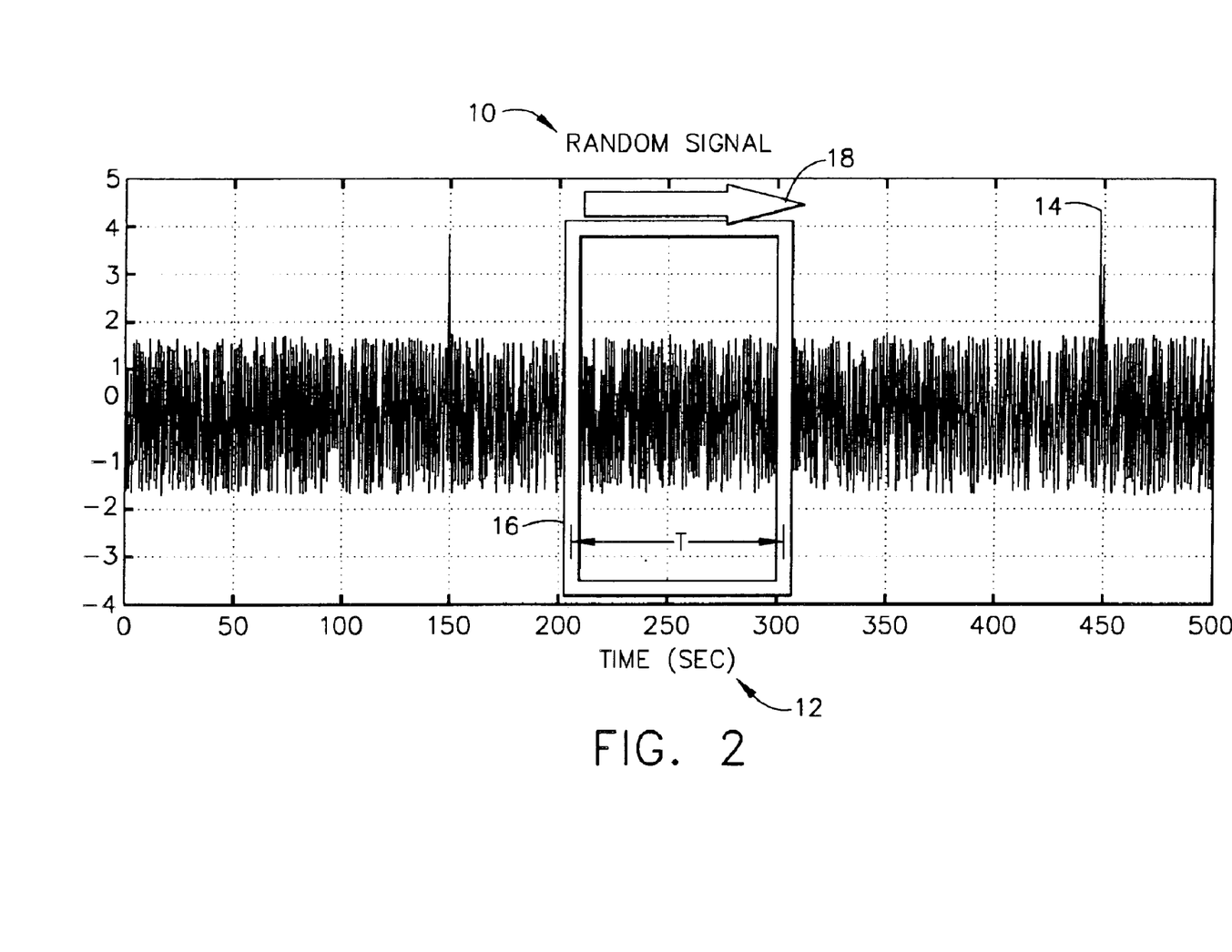
FIG. 2 shows, according to one embodiment of the present invention, a random signal, for example, a normal noisy signal with spikes, and a window T that slides along the horizontal axis, the horizontal axis is time t, the window T taking samples of the random signal at X(t), where the vertical axis is an amplitude.

When ACS designers talk about pointing stability in jitter analysis the definition of the signal characteristics and requirements, for example from project to project, are often confused. In one embodiment, a correct standard for pointing stability jitter analysis is provided. In the past, for example, the pointing accuracy was based on a spike 26 as shown in FIG. 2. The problem is that past attempts based the pointing accuracy on spikes that are four times as much than the normal signal, normal being the signal without a spike. Past attempts would then ignore the spikes without proper bases to do so and more importantly would give less accurate results. Therefore, there is a present need for a pointing stability jitter analysis that includes the spikes in the signal as part of the analysis.

Figure 1:
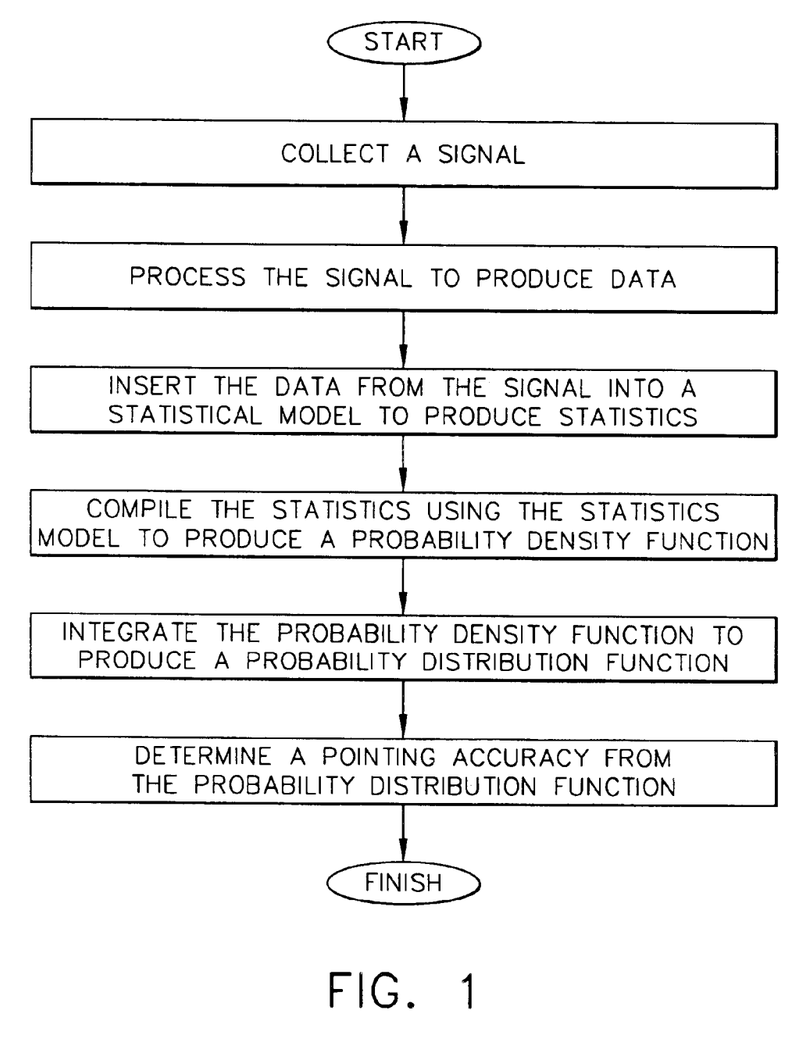
FIG. 1 shows, according to one embodiment of the present invention, a flow chart of the process of providing the pointing stability jitter analysis using a window average statistics model.

One embodiment of the present invention is shown in FIG. 1. This embodiment of the process is as follows: collect a signal 10, process the signal to produce data 12, insert the data from the signal into a statistical model to produce statistics 14, compile the statistics using the statistics model to produce a probability density function 16, integrate the probability density function to produce a probability distribution function 18, determine a pointing accuracy from the probability distribution function 20. The random signal 22 as shown in FIG. 2, is real and often seen, for example in some of the rate gyro sensor outputs. When the random signal appears over time 24, in seconds, the pointing stability accuracy could be out of requirements. Instead of attacking the problem statistically and mathematically, some designers, in past attempts, have spent a lot of time and project money to build software based on control laws to correct for the spiky data 26. Such attempts could have been totally avoided if the designer knew the solution as shown in the embodiments. This solution is a statistics model approach.

One embodiment first defines a statistics metric in the window T 28 where T usually comes from pointing stability requirements. Then, a few statistical assumptions are needed to create the statistics model: original signal x(t) is a stationary random process; x(t) is ergodic, ergodic means statistics taken in one time history equal statistics taken in different time histories. Hence, sliding the window 30 along x(t) makes statistical sense. A typical pointing accuracy requirement states as follows: within time window of 240 sec, the spacecraft attitude control error should not exceed 0.02 deg in 3-sigma or 3$\sigma$.

Once the statistics assumptions are defined, there are three methods to specify pointing accuracy S(t) on top of the original signal X(t) in the requirement window T:

First Method:

Maximum excursion in X(t) from $X(t_o)$ in window T $$S(t)=\max|X(t+\tau)-X(t)|\tau \in [0,T]$$

Second Method:
Maximum peak-to-peak in window T $$S(t)=\max(X(t+\tau))-\min(X(t+\tau)) \tau \in [0,T]$$

A MATLAB™ code implementing the above equation is simply for i=1: (npts−window+1);

sample=position(i: (i+window−1));

s(i,1)=abs(max(sample)−min(sample)); end;

Third Method:
Root-mean-square (rms) of X(t) in window T $$S(t)=X(t): X(t+\tau) \tau \in [0,T]$$

Figure 3:
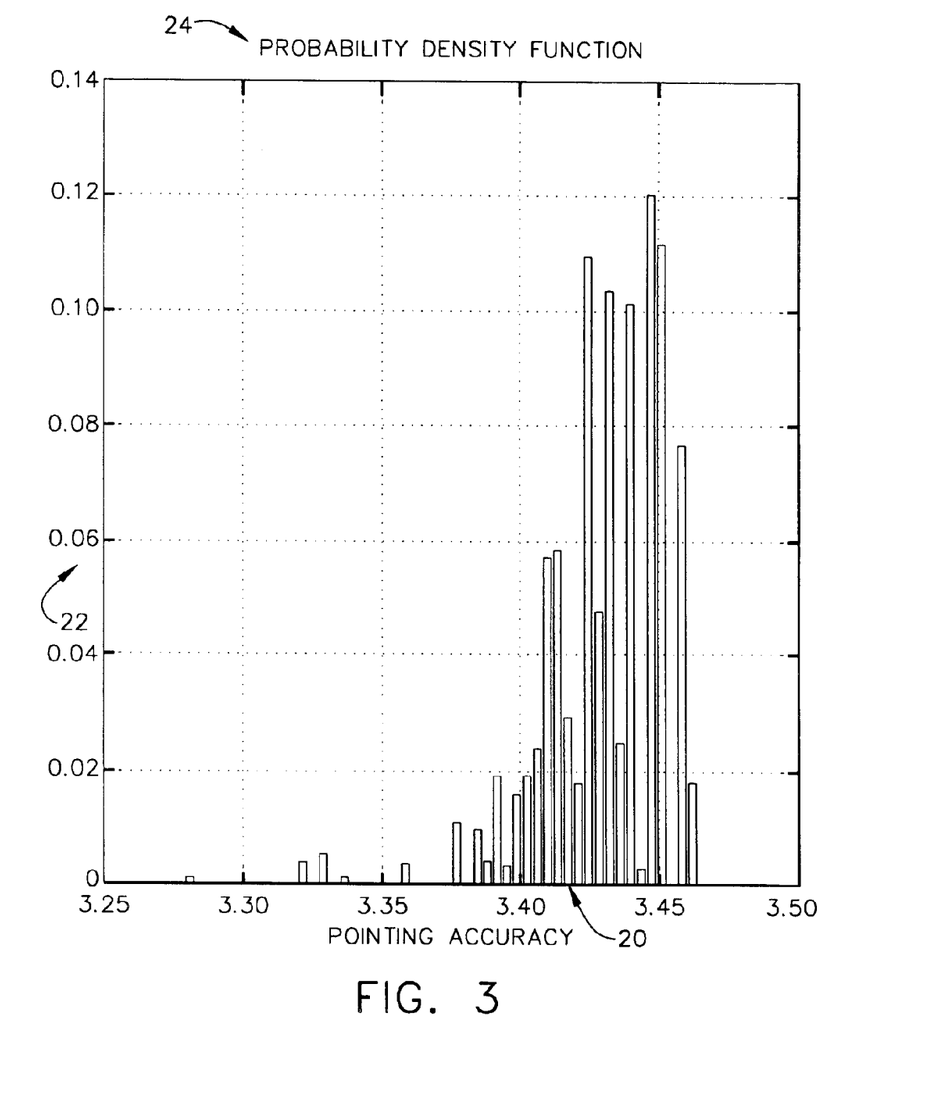
Figure 4:
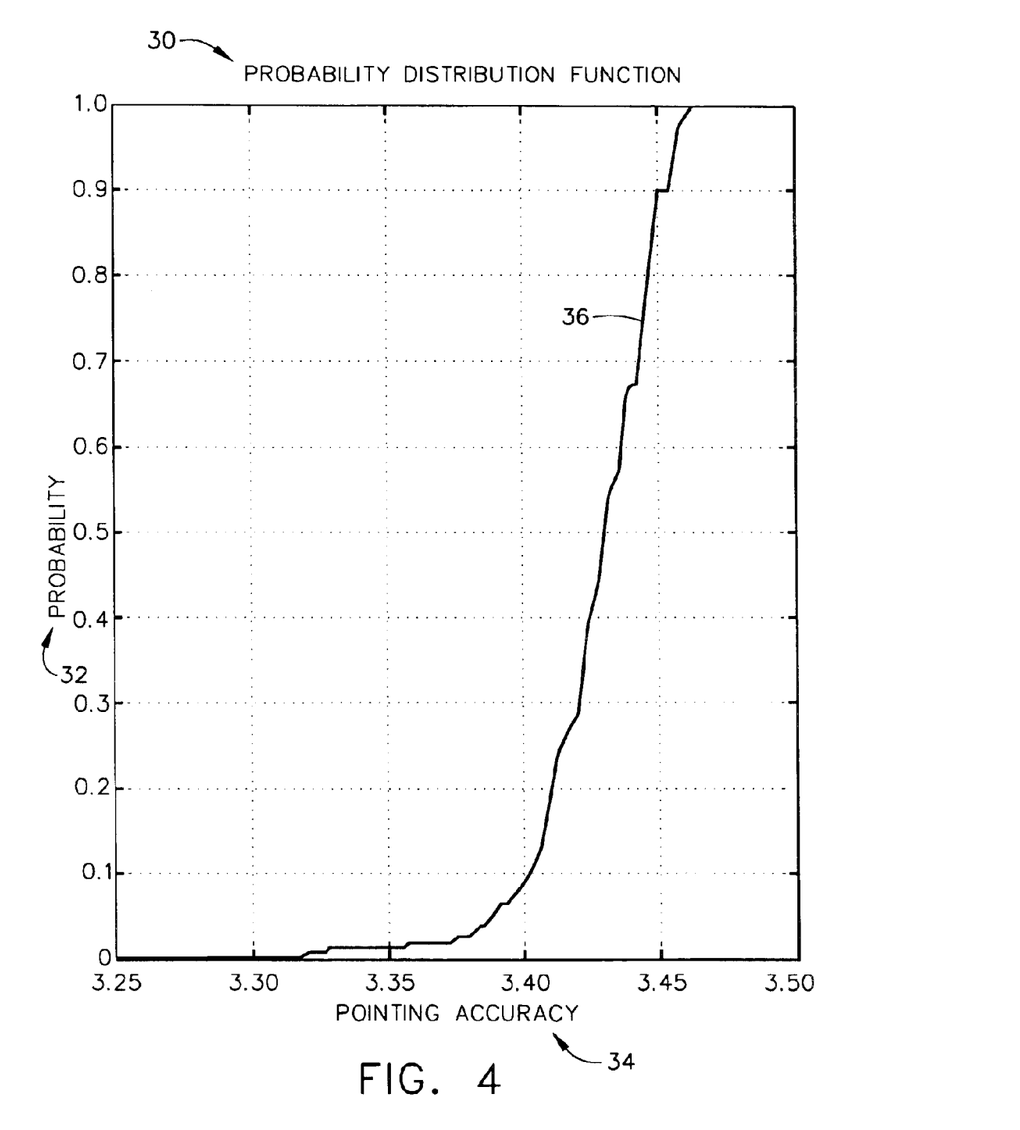
FIG. 4 shows, according to one embodiment of the present invention, a probability distribution function curve that results when the data from S(t) as a histogram in FIG. 2 is integrated.

A MATLAB™ code implementing the above equation is simply for i=1: (npts−window+1);

sample=position(i: (i+window−1));

s(i,1)=std(sample); end;

Putting the signal of FIG. 1 into statistics metric S(t), we have its histogram 32 as in FIG. 3. It's derived using a sliding window T across the entire signal X(t) one sample shift at a time and collects S(t) at each window T. The result S(t) can be put into a histogram 32 in FIG. 3. The vertical axis is probability 34. FIG. 3 shows the histogram of the signal in FIG. 1 as a probability density function 36. FIG. 4 shows a curve 40 produced after the histogram data in FIG. 3 is integrated. Integrating the statistics metric S(t) we have a probability distribution function 42. The vertical axis in FIG. 4 is probability 46 and the horizontal axis is a pointing accuracy 48.

Figure 5:
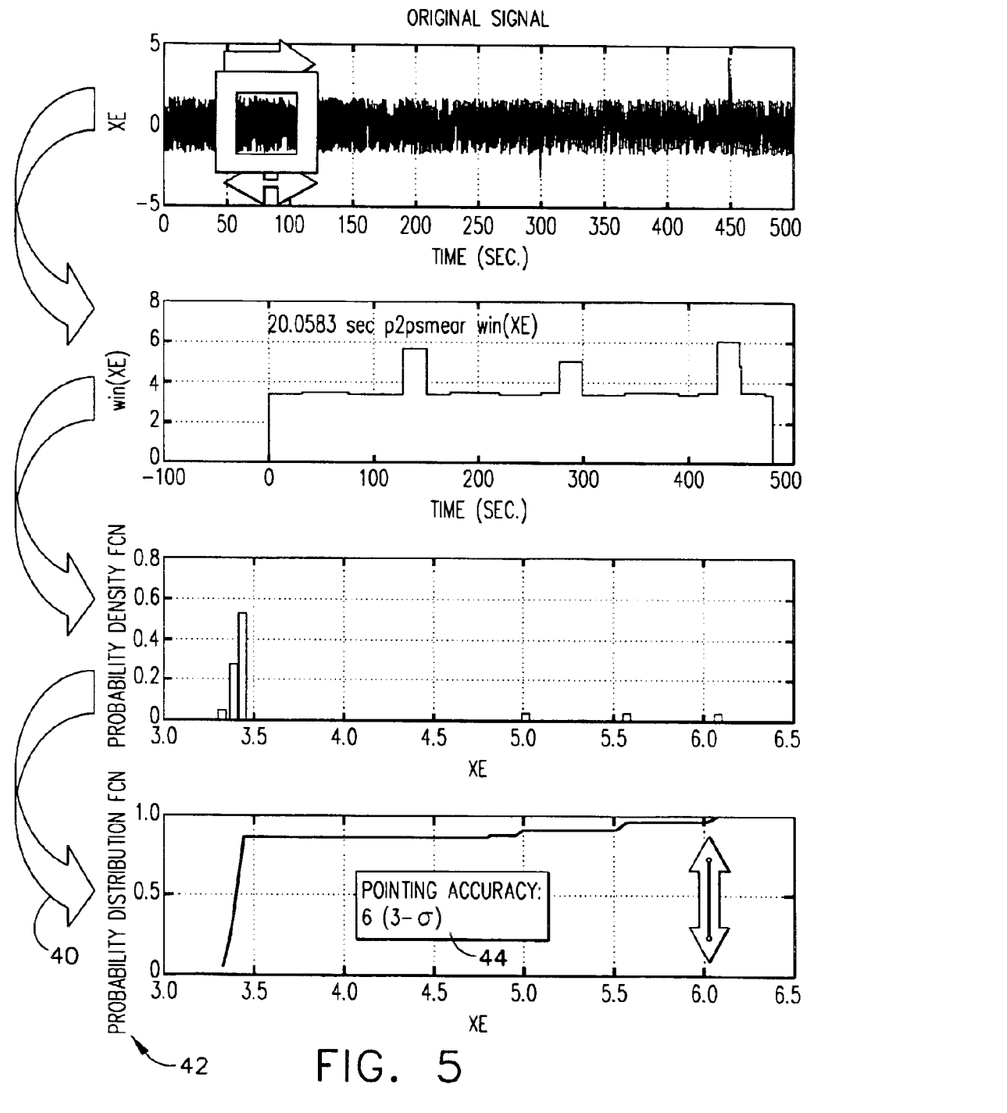
FIG. 5 shows according to one embodiment of the present invention, the second method as a statistics metric and a window size of 20 seconds.

The histogram of FIG. 5, third graph, is integrated 50 to produce the Probability Distribution Function 52. This exists where 3-sigma, 6 pointing accuracy 54 is, which is also 99.8% of the Probability Distribution Function. FIG. 5 shows the complete process using the statistics metric of the second method and a window size of 20 seconds 56.

Figure 6:
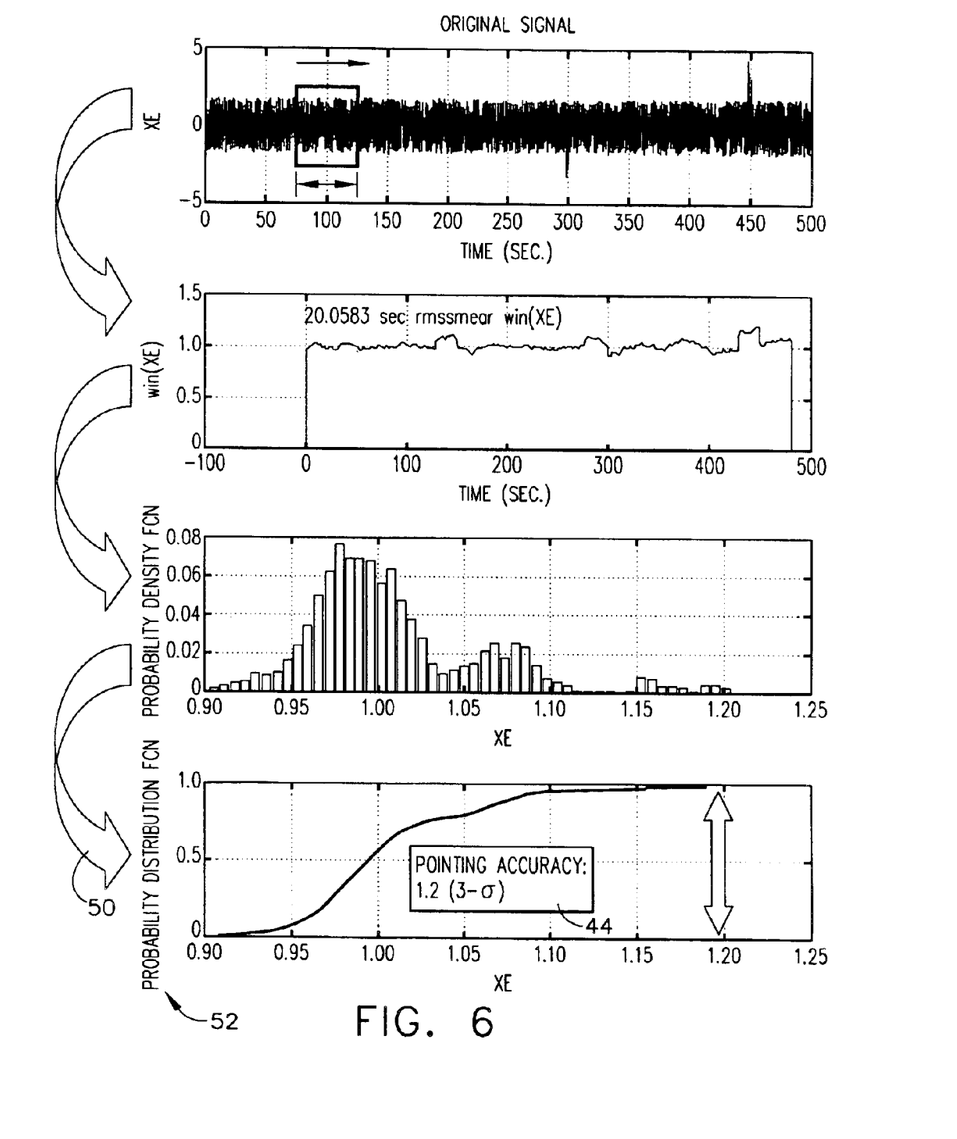
FIG. 6 shows, according to one embodiment of the present invention, the third method as a statistics metric.

FIG. 6 shows the complete process using the third method as the statistics metric. Comparing the second method and the third method, we can now see that choosing the statistics model is very important for pointing accuracy analysis. The end analysis result shows a difference between the numbers for pointing accuracy as 1.2 pointing accuracy 60 in FIG. 6, instead of 6 pointing accuracy 54 in FIG. 5.

For a spiky signal as shown in FIG. 1, we have to use the third method to avoid heavy penalty from the spike values. In this embodiment there is no need to remove those spikes in the signal with a lot of design and software implementation effort because one of the embodiments still meets the pointing requirements with the spiky signal data included in the analysis.

It should be understood, of course, that the foregoing relates to preferred embodiments of the invention and that modifications may be made without departing from the spirit and scope of the invention as set forth in the following claims.

I claim:

1. A method of analyzing a signal comprising the steps of:
collecting a signal;
processing the signal to produce data;
inserting the data from the signal into a statistical model to produce statistics;
compiling the statistics using the statistical model to produce a probability density function;
integrating the probability density function to produce a probability distribution function; and
determining a pointing accuracy from the probability distribution function.

2. The method of claim 1, wherein the statistics model is a statistics metric S(t), deriving the statistics metric using a sliding window T across the entire signal X(t) one sample at a time, the sliding window T collecting S(t) at each window T.

3. The method of claim 2, wherein the statistics metric S(t) is a pointing accuracy, the pointing accuracy is a maximum excursion in X(t) from $X(t_o)$ in window T and $$S(t)=\max|X(t+\tau)-X(t)| \tau \in [0,T].$$

4. The method of claim 2, wherein the statistics metric S(t) is a pointing accuracy, the pointing accuracy is a maximum peak-to-peak in window "T" and S(t)=max(X(t+τ))−min(X(t+τ)) where t∈[0,T].

5. The method of claim 2, wherein the statistics metric S(t) is a pointing accuracy, the pointing accuracy is a root-mean-square (rms) of X(t) in window T and S(t)=X(t): X(t+τ) where t∈ [0,T].

6. The method of claim 1, wherein the probability density function is a histogram.

7. The method of claim 1, wherein the pointing accuracy is 99.8% of the probability distribution function.

8. A statistics model for analyzing spacecraft attitude pointing stability in a jitter analysis, the statistics model having signals processed to accurately predict the pointing stability in flight comprising the steps of:
defining an ergodic random process statistically and mathematically;
creating a window averaging technique to slide through simulated signals;
building the statistics model;
loading statistics into a statistics metric and creating a probability density function (PDF);
and integrating the PDF to a probability distribution function and reading out a 3-σ pointing accuracy against requirements.

9. The statistics model of claim 8, wherein the statistics model is a statistics metric S(t), deriving the statistics metric using a sliding window T across the entire signal X(t) one sample at a time, the sliding window T collecting S(t) at each window T.

10. The statistics model of claim 8, wherein the statistics metric S(t) is a pointing accuracy, the pointing accuracy is a maximum excursion in X(t) from X(to) in window "T" and $$S(t)=\max|X(t+\tau)-X(t)| \tau \in [0,T].$$

11. The statistics model of claim 8, wherein the statistics metric S(t) is a pointing accuracy, the pointing accuracy is a maximum peak-to-peak in window "T" and S(t)=max(X(t+τ))−min(X(t+τ)) where t∈ [0,T].

12. The statistics model of claim 8, wherein the statistics metric S(t) is a pointing accuracy, the pointing accuracy is a root-mean-square (rms) of X(t) in window "T" and S(t)=X(t)): X(t+τ) where t∈[0,T].

13. The statistics model of claim 8, wherein the probability density function is a histogram.

14. The statistics model of claim 8, wherein the pointing accuracy is at 99.8% of the probability distribution function.

15. A method for analyzing spacecraft attitude pointing stability in a jitter analysis by processing a limited number of signals to accurately predict the pointing stability in flight, the method comprising the steps of:

defining an ergodic random process statistically and mathematically creating a window averaging technique to slide through the simulated signals building the statistics models;

placing the statistics into a histogram and create the Probability Density Function (PDF);

and integrating the PDF to Probability Distribution function and read out the 3-$\sigma$ pointing accuracy against the requirements.

16. The statistics model of claim 15, wherein the statistics model is a statistics metric S(t), deriving the statistics metric using a sliding window T across the entire signal X(t) one sample at a time, the sliding window T collecting S(t) at each window T.

17. The statistics model of claim 15, wherein the statistics metric S(t) is a pointing accuracy, the pointing accuracy is a maximum excursion in X(t) from X(to) in window "T" and $$S(t)=\max|X(t+\tau)-X(t)|\tau\in[0,T].$$

18. The statistics model of claim 15, wherein the statistics metric S(t) is a pointing accuracy, the pointing accuracy is a maximum peak-to-peak in window "T" and S(t)=max(X(t+$\tau$))−min(X(t+$\tau$)) t$\in$[0,T].

19. The statistics model of claim 15, wherein the statistics metric S(t) is a pointing accuracy, the pointing accuracy is a root-mean-square (rms) of X(t) in window "T" and S(t)=X(t)): X(t+$\tau$) t$\in$[0,T].

20. The statistics model of claim 15, wherein the probability density function is a histogram.

21. The statistics model of claim 15, wherein the pointing accuracy is at 99.8% of the probability distribution function.

22. A signal processing scheme for analyzing spacecraft attitude stability in a jitter analysis, the scheme processing a limited number of signals to accurately predict a pointing stability in flight, the scheme comprising the steps of:

collecting a signal;

processing the signal to produce data;

inserting the data from the signal into a statistical model to produce statistics, the statistics model is a statistics metric S(t), deriving the statistics metric using a sliding window T across the entire signal X(t) one sample at a time, the sliding window T collecting S(t) at each window T, the statistics metric S(t) is a pointing accuracy;

compiling the statistics using the statistical model to produce a probability density function;

integrating the probability density function to produce a probability distribution function, the probability density function is a histogram; and determining a pointing accuracy from the probability distribution function, the pointing accuracy is at 99.8% of the probability distribution function.

23. The signal processing scheme of claim 22 wherein a phase recovery filter recovers a phase stability margin.

24. The signal processing scheme of claim 22, wherein the pointing accuracy is a maximum excursion in X(t).

25. The signal processing scheme of claim 22, wherein the statistics metric S(t) is a pointing accuracy, the pointing accuracy is a maximum peak-to-peak in window T.

26. The signal processing scheme of claim 22, wherein the statistics metric S(t) is a pointing accuracy, the pointing accuracy is a root-mean-square (rms) of X(t) in window T.

* * * * *